United States Patent [19]
Johnson et al.

[11] Patent Number: 5,825,107
[45] Date of Patent: Oct. 20, 1998

[54] DRIVE PACKAGE FOR A DYNAMOELECTRIC MACHINE

[75] Inventors: Philip W. Johnson, Bluffton; Jeffrey D. Neumann; Mark A. Brattoli, both of Fort Wayne, all of Ind.

[73] Assignee: General Electric Company, Fort Wayne, Ind.

[21] Appl. No.: 874,993

[22] Filed: Jun. 13, 1997

[51] Int. Cl.⁶ .............................. H02K 9/22; H02K 9/00
[52] U.S. Cl. ............................ 310/64; 310/42; 310/68 R
[58] Field of Search ................................ 310/42, 45, 64, 310/65, 68 R

[56] References Cited

U.S. PATENT DOCUMENTS

| | | | |
|---|---|---|---|
| 3,250,929 | 5/1966 | Maier | 310/68 |
| 3,772,452 | 11/1973 | Usowski | 174/52 |
| 3,911,327 | 10/1975 | Murari et al. | 317/100 |
| 4,011,398 | 3/1977 | Munz et al. | 174/52 |
| 4,230,901 | 10/1980 | Wengler et al. | 308/132 |
| 4,329,603 | 5/1982 | Ballard | 310/61 |
| 4,594,644 | 6/1986 | Painter | 361/417 |
| 4,628,146 | 12/1986 | Schmotz et al. | 174/52 |
| 4,636,920 | 1/1987 | Cook et al. | 361/420 |
| 4,668,898 | 5/1987 | Harms et al. | 318/254 |
| 4,712,160 | 12/1987 | Sato et al. | 361/388 |
| 4,840,222 | 6/1989 | Lakin et al. | 165/47 |
| 4,883,982 | 11/1989 | Forbes et al. | 310/62 |
| 5,004,942 | 4/1991 | King | 310/89 |
| 5,006,744 | 4/1991 | Archer et al. | 310/89 |
| 5,049,769 | 9/1991 | Reinhardt et al. | 310/64 |
| 5,087,497 | 2/1992 | Suzuki et al. | 428/64 |
| 5,339,215 | 8/1994 | Nishiguchi | 361/704 |
| 5,396,404 | 3/1995 | Murphy et al. | 361/719 |
| 5,574,321 | 11/1996 | Baker | 320/67 |

FOREIGN PATENT DOCUMENTS

| | | | |
|---|---|---|---|
| 60-82042 | 5/1985 | Japan | 310/64 |

*Primary Examiner*—Steven L. Stephan
*Assistant Examiner*—Judson H. Jones
*Attorney, Agent, or Firm*—Enrique J. Mora

[57] ABSTRACT

A drive package for a dynamoelectric machine mounts a printed wire board in cantilever fashion from a wall of a drive package housing. Potting material in the housing provides mechanical support for the printed wire board away from the heat sink. Heat generating components on the first printed wire board have tubes of electrically insulating, thermally conductive material inserted over them and are clamped against the heat sink. The heat sink is mounted directly to the housing and is electrically grounded by the housing.

27 Claims, 4 Drawing Sheets

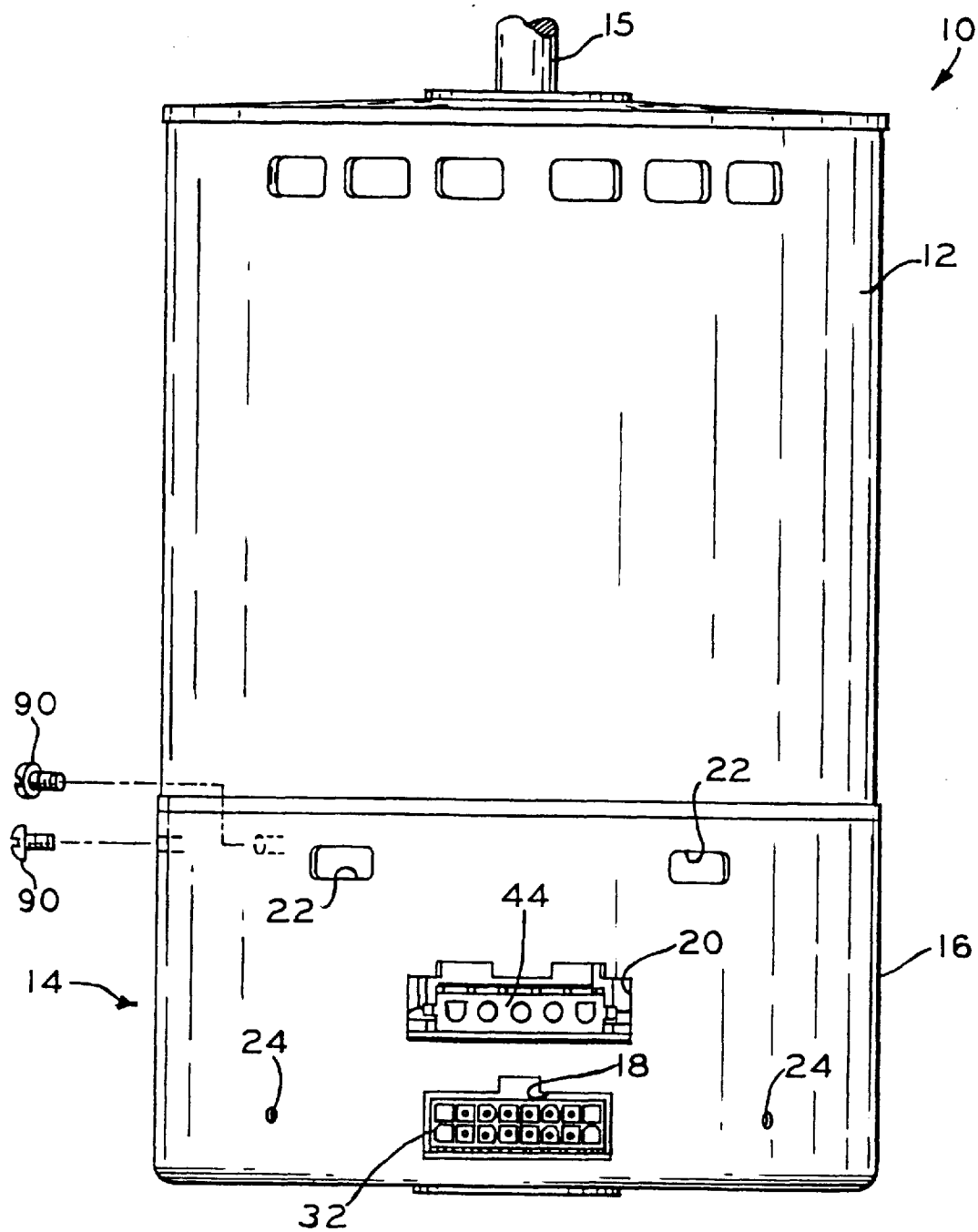
FIG_1

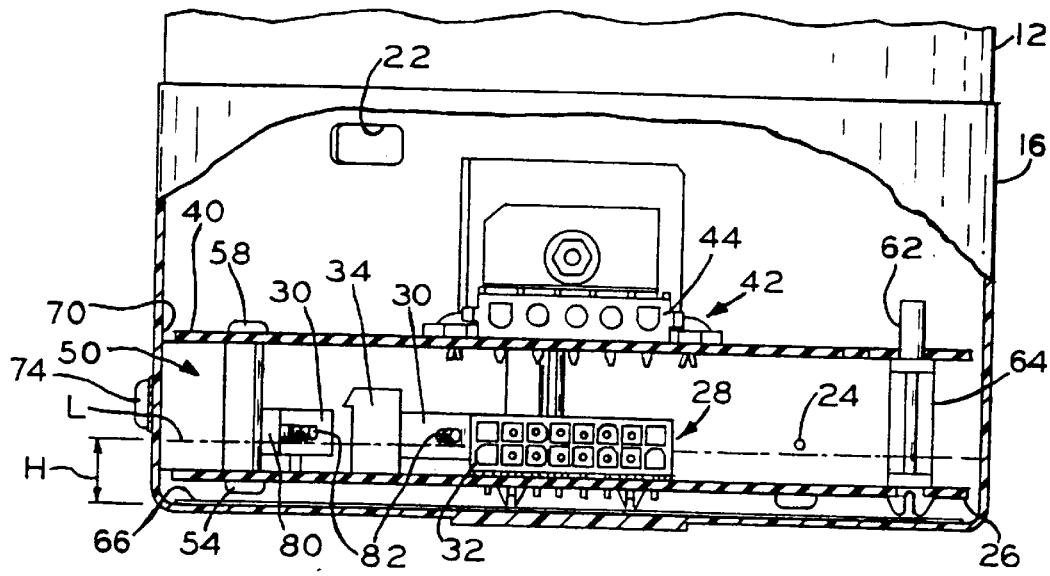
FIG_2
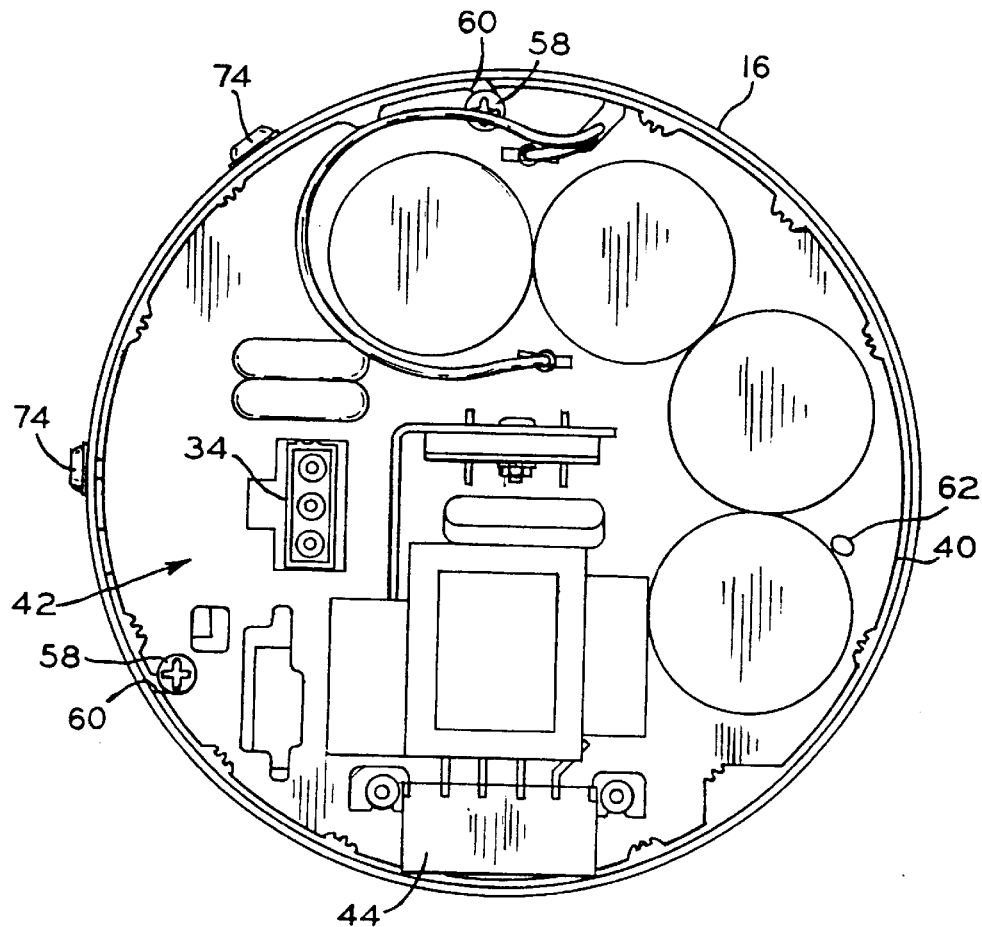
FIG_3

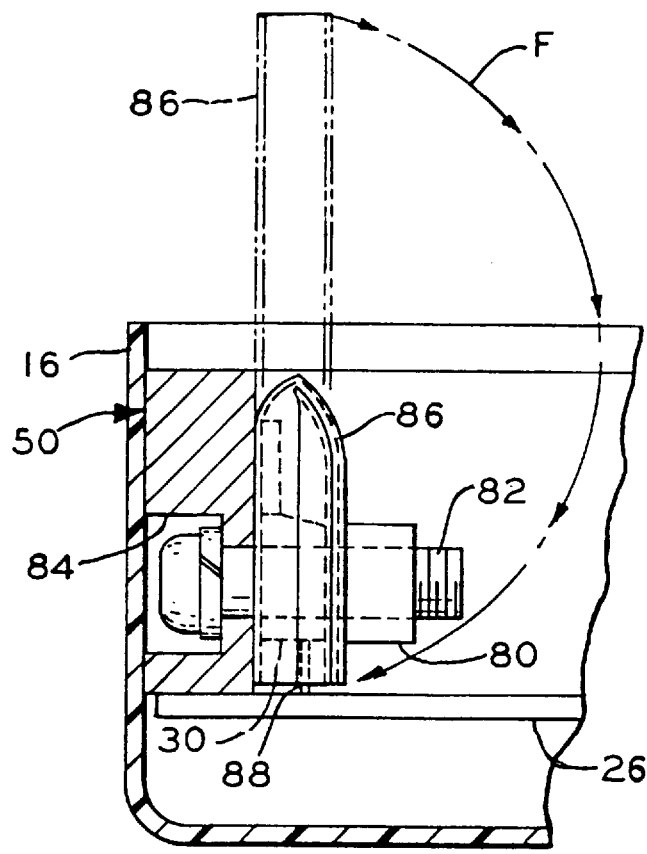
FIG_5
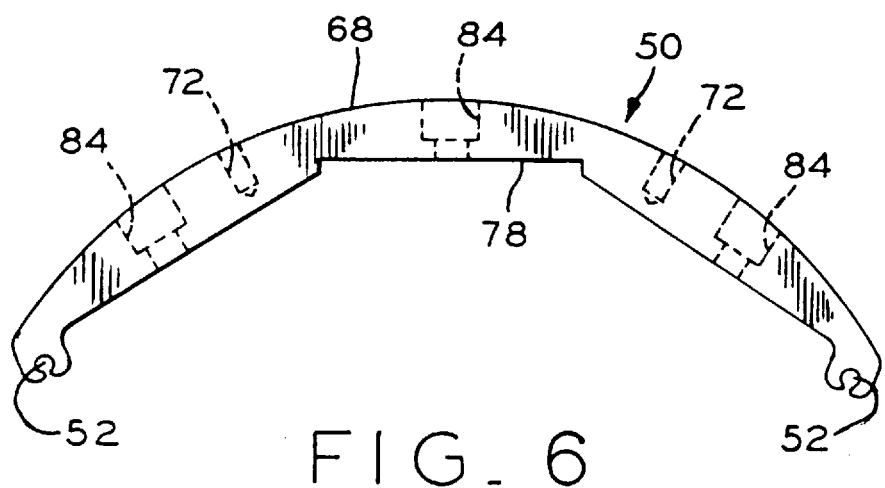
FIG_6

DRIVE PACKAGE FOR A DYNAMOELECTRIC MACHINE

FIELD OF THE INVENTION

This invention relates generally to dynamoelectric machines and more particularly to a drive package for a dynamoelectric machine.

BACKGROUND OF THE INVENTION

Mass production of electric motors demands that materials and assembly steps be kept to a minimum to hold down costs. However, the quality and reliability of the motor produced must be maintained or improved by any reduction of materials or assembly steps. For example, electronically commutated motors include electronic components and other circuitry for controlling the motor. The circuitry is often mounted on printed wire boards. It is necessary to provide mounting structure in the motor for the wire boards. In order to securely hold the wire boards, attachment of the boards to mounting structure at several locations around the boards is necessary. The mounting structure may include heat sinks which transfer heat from the electronic components on the wire boards in addition to mounting the wire boards. The mounting structure and the steps needed to secure the wire boards to the structure add cost to the motor.

While it is beneficial to have the power components in contact with the heat sink for the best heat transfer, these components must be electrically isolated from the heat sink and/or the heat sink must be insulated from ground. In order to accomplish this, thermally conductive but electrically insulating material has been installed between the heat sink and the drive package housing. The same or similar material has been installed between the power components and the heat sink. The material tends to be expensive, and the installation steps retard the rate at which the motors, and in particular the drive packages, can be manufactured.

These electric motors are commonly used in environments which subject the motors to moisture. For example, motors which run blowers for HVAC systems are subject to moisture from condensation when the air conditioning is operating. Control circuitry for the motors can be sensitive to the moisture causing failure of the motor requiring replacement of the drive package. As a result of the sensitivity of the circuitry to moisture, it is well known to encase sensitive components of the circuitry in a potting material which seals the circuitry from the moisture. However, if moisture is allowed to accumulate and stand on the potting material for extended periods of time, there is a risk that moisture will seep through the potting material and come into contact with the circuitry.

SUMMARY OF THE INVENTION

A drive package for a dynamoelectric machine generally comprises a printed wire board having circuitry thereon for operating the dynamoelectric machine, the circuitry including heat generating electronic components. A heat sink in thermal contact with at least some of the heat generating components of the circuitry on the printed wire board draws heat from the components. A housing receiving and supporting the printed wire board and heat sink. The heat sink is mounted on the housing and the printed wire board is mounted on the heat sink and extends outwardly from the heat sink in cantilever fashion at a level in the housing. Potting material fills the housing to at least about the level of the printed wire board. The potting material is in contact with the printed wire board and provides mechanical support for the printed wire board in the housing away from the heat sink.

The drive package of the present invention has a number of advantages over the prior art. The potting material provides structural support for the printed wire board so that additional supports for the printed wire board do not need to be provided in the housing. Drain holes are provided to prevent water from accumulating and standing in the motor above the potting material. The heat sink can be made as a single, unitary piece extending only a fraction of the way around the periphery of the printed wire board. The heat sink and printed wire board can easily be pre-assembled before placement in the housing. The heat sink can be installed without electrically insulating the heat sink from the motor housing.

DESCRIPTION OF THE DRAWINGS

FIG. 1 is an elevational view of a dynamoelectric machine including a drive package;

FIG. 2 is an enlarged elevational view of the drive package with a housing of the drive package broken away to reveal a simplified internal construction of the drive package;

FIG. 3 is a top plan view of the drive package;

FIG. 5 is a fragmentary sectional view taken in the plane including line 5—5 of FIG. 4; and FIG. 6 is a top plan view of a heat sink of the drive package.

Corresponding reference characters indicate corresponding parts throughout the several views of the drawings.

DETAILED DESCRIPTION OF THE INVENTION

Figure 4:
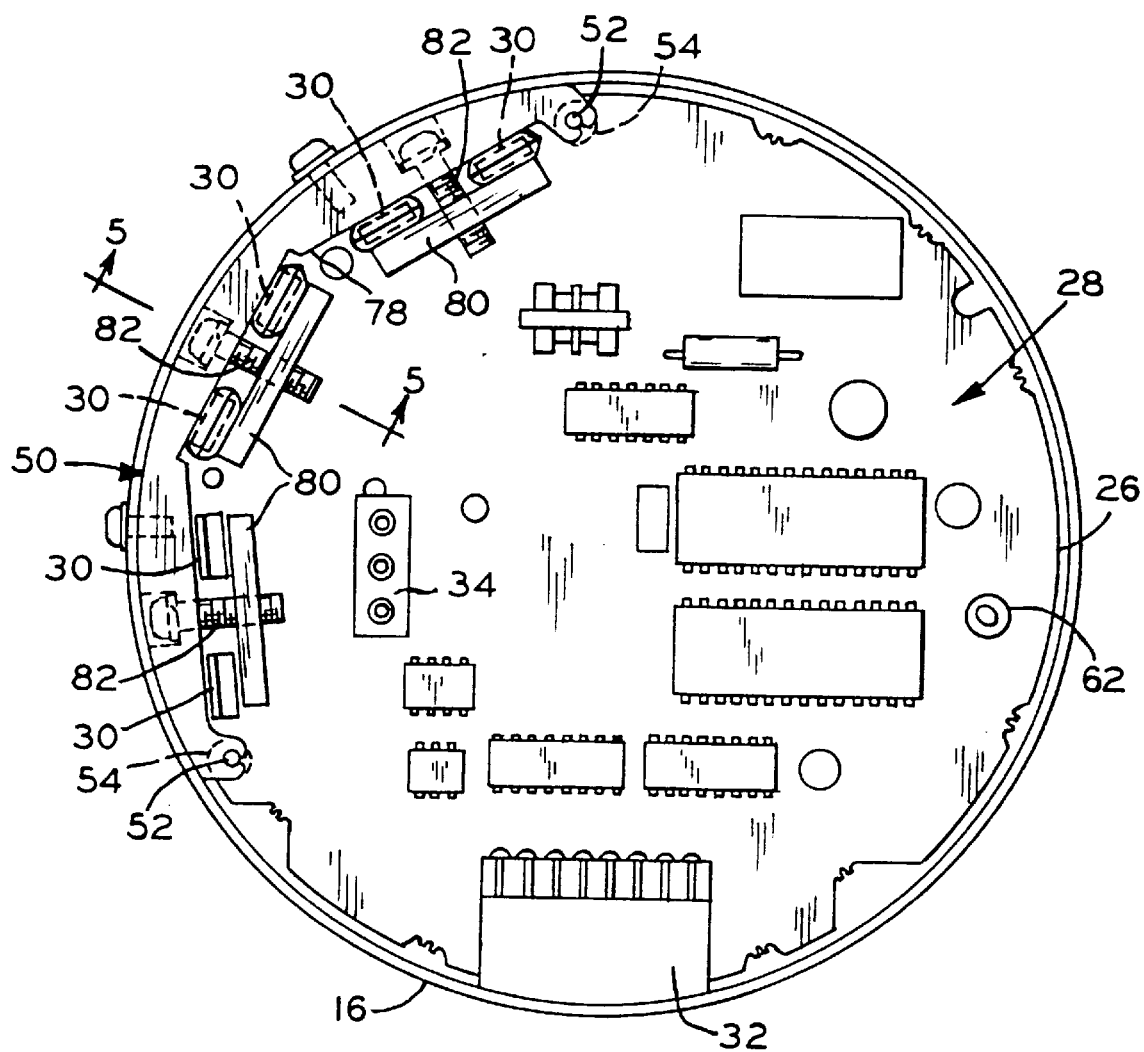
FIG. 4 is a top plan view of the drive package with a top printed wire board thereof removed.

Referring now to the drawings, and in particular FIGS. 1 and 2, a dynamoelectric machine generally indicated at 10, is shown in the form of an electronically commutated electric motor. The dynamoelectric machine 10 includes a shell 12 which contains a stator, windings and rotor of the machine, and a drive package generally indicated at 14. Although not shown, the construction and arrangement of the stator, windings and rotor is well known to those of ordinary skill in the art, and may take on any suitable configuration. The rotor includes a shaft 15 which protrudes from the shell 12. As illustrated in FIG. 1, the dynamoelectric machine 10 may be mounted vertically in operation, such as for use in driving a blower of a HVAC system. However, the orientation of the dynamoelectric machine may be other than described without departing from the scope of the present invention.

The drive package 14 includes a housing (indicated in its entirety by reference numeral 16) in the form of a drawn steel cup having a generally cylindrical shape. The housing 16 has control and power connector openings (designated 18 and 20, respectively), ventilation openings 22 and drain holes 24. Referring to FIGS. 2 and 4, the drive package 14 further includes a first, generally circular printed wire board 26 having circuitry (generally indicated at 28) for operating the dynamoelectric machine 10. The circuitry 28 includes heat generating electronic components 30, a connector socket 32, a three pin connector 34 for plugging into the windings of the dynamoelectric machine 10 and other suitable components. The construction, arrangement and operation of the circuitry 28 of the first printed wire board 26, except as further described hereinbelow, is well known to those of ordinary skill in the art and will not be described in detail. A control (not shown) of a device (e.g., an HVAC system) which uses the dynamoelectric machine 10 can be plugged into the connector socket 32. The circuitry 28 on the first printed wire board 26 may be, for example, that needed to condition the signal from the device control for use by the dynamoelectric machine 10.

As shown in FIGS. 2 and 3, the drive package 14 further includes a second, generally circular printed wire board 40 in the illustrated embodiment. However, it is to be understood that only one of the printed wire boards, or more than two printed wire boards may be used without departing from the scope of the present invention. The second or "top" printed wire board 40 mounts circuitry (indicated generally at 42) including a connector socket 44. As an example, the connector socket 44 may be constructed for connection to an electrical power source (not shown). In that event, the circuitry 42 on the second printed wire board 40 might include front end DC conversion components which convert AC input power into DC power. It is to be noted that substantially all of the circuitry 28, 42 of the first and second wire boards 26, 40 has been eliminated in FIG. 2 to simplify the drawing. Some exemplary components of the circuitry 28, 42 are illustrated on the wire boards in FIGS. 3 and 4.

A heat sink, generally indicated at 50, is made of heat conductive material and has a generally arcuate shape as seen in FIG. 6 of the drawings. Holes 52 located in the ends of the heat sink 50 extend through the heat sink. As illustrated, the holes 52 are not completely closed and appear generally C-shaped as seen in FIG. 6. However, it is envisioned that the holes 52 could be completely closed, and also that the holes could be tapped through. The first printed wire board 26 is mounted on the heat sink 50 by two screws 54 which are received in slots (not shown) in the periphery of the wire board and extend upwardly into respective ones of the holes 52 on the ends of the heat sink (FIG. 4). Similarly, the second printed wire board 40 is mounted on the heat sink 50 by two screws 58 which are received in slots 60 in the periphery of the second printed wire board and extend downwardly into respective ones of the holes 52 (FIG. 3). The first and second printed wire boards 26, 40 extend outwardly from the heat sink 50 and are connected together by a tie 62 at a location spaced from the heat sink (FIG. 2). The tie rigidities the printed wire boards 26, 40 and helps to support the boards in position away from the heat sink 50. The tie 62 includes a spacer 64 between the wire boards which holds the wire boards 26, 40 at a minimum fixed spacing generally corresponding to the height of the heat sink 50.

The first and second wire boards 26, 40 are generally circular and the heat sink 50 is curved with substantially the same radius of curvature. A drive package subassembly of the wire boards 26, 40 mounted on the heat sink 50 outside of the housing 16 is generally disk shaped and so is able to drop easily into the open top of the cylindrical housing. Preferably, a circular sheet 66 of electrically insulating material (e.g., a polyester film sold under the trademark MYLAR) is placed in the bottom of the housing 16 prior to placement of the drive package subassembly in the housing. An outer wall 68 of the heat sink 50 is curved so that it is able to fit flush against a cylindrical interior wall 70 of the housing 16. The heat sink 50 has first openings 72 in its outer wall (FIG. 6) which can be brought into registration with corresponding openings (not shown) on the housing 16. Suitable fasteners 74, such as thread rolling screws, are fitted through the openings in the housing 16 and into the first openings 72 for mounting the heat sink 50 on the housing. In the preferred embodiment, there is no electrically insulating material between the heat sink 50 and the housing 16. Therefore, the housing 16 electrically grounds the heat sink 50. The printed wire boards 26, 40 extend outwardly in cantilever fashion from the heat sink 50 in the housing 16, with the first printed wire board at a level spaced from the bottom of the housing.

A suitable potting material fills the housing 16 from the bottom to a height indicated at H and a level indicated at L in FIG. 2. For clarity in the drawings, the potting material itself has not been illustrated. However, it is to be understood that any suitable potting material can be used and that the potting material fills the housing 16 from its bottom to the level L indicated in FIG. 2. Further references to the potting material herein will be accompanied by the reference numeral L. The potting material L substantially covers the circuitry 28 on the first printed wire board 26 and seals the circuitry against moisture. The drain holes 24 in the housing 16 are located at a level just above the level L of the potting material. Thus, moisture on top of the potting material in the housing 16 is drained out of the housing through the drain holes 24 and does not accumulate above the potting material.

The potting material L also structurally supports the first printed wire board 26. The hardened potting material contacts both the bottom of the housing 16 and the first printed wire board 26. Thus, the potting material L supports the first wire board at a fixed spacing from the bottom of the housing 16. The second printed wire board 40 is connected by the tie 62 to the first printed wire board 26, and is therefore also supported by the potting material. The lower end of the tie 62 is immersed in the potting material L. No other supports formed on the housing 16 or attached to the housing are required to mechanically support the wire boards 26, 40. No connections need to be made apart from the connection of the heat sink 50 to the housing 16 once the drive package subassembly is placed in the housing. The potting material L is preferably the sole support of the wire boards 26, 40 away from the heat sink 50.

The heat sink 50 and the first printed wire board 26 are constructed and arranged for transferring heat from primary heat generating components 30 of the circuitry 28. Although other components of the wire board circuitry 28, 42 may generate heat, the primary heat generating components 30 are those which generate the most heat or are most susceptible to failure caused by high temperature. The heat generating components 30 may be, for example, TO-220 power switch (IGBT) packages. As illustrated in FIG. 4, there are six heat generating components 30. The heat generating components 30 are connected to the first printed wire board 26 and project upwardly from the wire board.

The heat generating components 30 are located between an inner wall 78 of the heat sink 50 and one of three clamps 80. The inner wall 78 includes three flat sections located in registration with respective pairs of heat generating components 30. The clamps 80 are connected to the heat sink 50 by suitable fasteners 82, such as bolts. The fasteners 82 are received into counterbored second openings 84 in the heat sink 50 and through openings (not shown) in the clamps 80. The fasteners 82 and clamp openings are preferably threaded so that as the fastener is tightened the clamps 80 are drawn toward the inner wall 78 of the heat sink 50. The clamps 80 clamp the heat generating components 30 against the inner wall 78 of the heat sink 50, placing the heat generating components in thermal contact with the heat sink.

The heat generating components 30 are each substantially covered by an insulator tube 86 made of electrically insulating but thermally conductive material. In the illustrated embodiment, the insulator tubes 86 are made of a polyamide film sold under the trademark KAPTON®. The insulator tubes 86 are slid down over respective heat generating components 30 before the components are clamped against the inner wall of the heat sink 50. Only four of the six total insulator tubes are illustrated on the heat generating components 30 in FIG. 4 so that the heat generating components are clearly seen between the clamp 80 and the inner wall 78 of the heat sink. As shown in FIG. 5, the tubes 86 are each pinched off above the heat generating component and the portion above the component is folded over onto itself (as indicated by arrows F) between the insulator tube and the clamp 80. Thus, the insulator tube 86 completely encloses the heat generating component 30 on its top and sides. However, the bottom of the tube 86 is open, permitting the connection of the component 30 to the first printed wire board 26. Clamping the heat generating component 30 against the heat sink 50 secures the insulator tube 86 in its folded position. The insulator tube 86 is everywhere located between the heat generating component 30 and the heat sink 50, and between the heat generating component and the clamp 80.

Having described the construction of the drive package 14, a method of assembling the drive package will now be described. The first and second printed wire boards 26, 40, the housing 16, the heat sink 50 (including the clamps 80) and insulator tubes 86 are provided. Only one or more than two wire boards could be provided without departing from the scope of the invention. The wire boards 26, 40 may be configured, for example, to operate an electronically commutated motor used to drive a blower in an HVAC system. The heat sink 50 may be formed as a unitary piece of aluminum or other suitable, material having high thermal conductivity. The insulator tubes 86 are formed from electrically insulating, thermally conductive material, such as a polyamide film which is wrapped in a spiral configuration to form the tubes.

The insulator tubes 86 are slid down over respective heat generating components 30. Portions of the tubes 86 above the heat generating components 30 are pinched off and folded over on themselves between the components and the clamps 80 (FIG. 5). Fasteners 82 inserted into the counterbored openings 84 and into the clamps 80 are tightened to clamp the heat generating components 30 against the inner wall 78 of the heat sink 50. Only the insulator tube 86 engages the clamp 80 or the inner wall 78 of the heat sink 50. The heat sink 50, heat generating components 30 and insulator tubes 86 may be pre-assembled at a location remote from where the drive package 14 is finally assembled.

The first printed wire board 26 is attached to the heat sink 50 at peripheral edge locations of the wire board using the screws 54. Leads 88 (FIG. 5, only one is shown) from the heat generating components 30 are received through holes in the first printed wire board 26 and bent over to prevent accidental withdrawal. The leads 88 are soldered in a suitable manner (e.g., as by a wave solder process) to the first printed wire board 26 and make connection with the circuitry 28 of the first printed wire board. The second printed wire board 40 is attached using screws 58 to the top side of the heat sink 50. The first and second printed wire boards 26, 40 are joined together by connecting the tie 62 to the wire boards. Suitable electrical connections between the first and second printed wire boards 26, 40 are made. The spacer 64 of the tie engages the opposing surfaces of the wire boards 26, 40 and holds the wire boards at a minimum spacing. The heat sink 50 is located substantially entirely between the wire boards 26, 40. There is ample room on the wire boards to place larger circuitry components. Thus, the drive package 14 is readily adaptable for use in operating different dynamoelectric machines by attaching different circuitry components (not shown) on the wire boards 26, 40.

The first and second printed wire boards 26, 40 and the heat sink 50 form the drive package subassembly which can be dropped into the housing 16. Prior to insertion of the drive package subassembly, the sheet 66 of electrically insulating material is placed in the bottom of the housing 16. The connector sockets 32, 44 of the wire boards are aligned with the corresponding openings 18, 20 in the housing 16. The drive package subassembly is oriented so that the holes 72 in the heat sink 50 are aligned with corresponding openings in the housing. The fasteners 74 are inserted through the openings in the housing 16 and into the heat sink 50 to mount the heat sink on the interior wall 70 of the housing. The wire boards 26, 40 extend outwardly from the heat sink 50 over the bottom of the housing 16 in cantilever fashion.

Potting material in a flowable state is poured into the housing 16 to the level L below the drain hole openings 24 in the housing. The potting material substantially covers the first printed wire board 26. The potting material hardens and seals the circuitry 28 on the first printed wire board 26 from moisture. The first printed wire board 26 is directly supported at locations spaced from the heat sink 50 by the potting material L. The tie 62 transmits this support to the second printed wire board 40. Thus, the potting material L provides a structural support for both of the wire boards 26, 40. It is to be understood that deviations from the foregoing steps, and in the order of the steps can be made without departing from the scope of the present invention.

After the drive package 14 is fully assembled it is attached to a dynamoelectric machine 10, as shown in FIG. 1. The attachment can be made by two fasteners 90 (FIG. 1) which are received through the housing 16 and into the shell 12 of the dynamoelectric machine 10. Appropriate electrical connections are made to the motor windings through the connector 34. Thus, the drive package 14 is constructed for replacement of existing drive packages in the field without replacement of the entire dynamoelectric machine.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A drive package for a dynamoelectric machine comprising:

a printed wire board having circuitry thereon for operating the dynamoelectric machine, the circuitry including heat generating components;

a housing receiving and supporting the printed wire board at a peripheral edge location on the printed wire board at one side of the printed wire board, the printed wire board extending outwardly from the housing in cantilever fashion at a level in the housing;

potting material in the housing and filling the housing to at least about the level of the printed wire board, the potting material being in contact with the printed wire board and providing mechanical support for the printed wire board in the housing away from the peripheral edge portion.

2. A drive package as set forth in claim 1 further comprising a heat sink for transferring heat from at least some of the heat generating components of the circuitry on the printed wire board for transferring heat from the components, the heat sink being mounted on the housing and the printed wire board being mounted on the heat sink at the peripheral edge location and extending outwardly from the heat sink in cantilever fashion.

3. A drive package as set forth in claim 1 wherein the potting material is the sole support of the printed wire board away from the heat sink.

4. A drive package as set forth in claim 2 wherein the potting material substantially seals the circuitry on the printed wire board from moisture, and wherein the housing has drain holes therein located closely adjacent to the potting material for draining moisture from the housing thereby to prevent an accumulation of moisture in the housing above the potting material.

5. A drive package as set forth in claim 2 wherein the printed wire board constitutes a first printed wire board, the drive package further comprising a second printed wire board mounted on the heat sink and extending outwardly therefrom in the housing in cantilever fashion generally above the potting material, a tie located remotely from the heat sink and attached to the first printed wire board, the tie being further attached to the second printed wire board whereby the potting material supports the second printed wire board away from the heat sink through the tie.

6. A drive package as set forth in claim 5 wherein the tie is partially immersed within the potting material.

7. A drive package as set forth in claim 2 wherein the heat sink comprises a clamp for clamping at least one of the heat generating components of the circuitry on the first printed wire board against the heat sink.

8. A drive package as set forth in claim 7 further comprising an insulator member made of electrically insulating and thermally conductive material disposed between said one heat generating component and the heat sink and between said one heat generating component and the clamp thereby to electrically insulate said one component from the heat sink.

9. A drive package as set forth in claim 8 wherein the insulator member comprises an insulator tube receiving said one heat generating component therein.

10. A drive package as set forth in claim 9 wherein the insulator tube is pinched off above said one heat generating component and folded over on itself between the clamp and said component thereby to enclose said component except at the bottom thereof.

11. A drive package as set forth in claim 10 wherein the insulator tube is made of a polyamide film.

12. A drive package as set forth in claim 2 wherein the housing has an interior wall, the heat sink being in face-to-face engagement with the interior wall, the heat sink and housing being made of electrically conductive material whereby the engagement of the heat sink with the housing electrically grounds the heat sink.

13. A drive package as set forth in claim 1 in combination with the dynamoelectric machine operated using the drive package.

14. A drive package for a dynamoelectric machine comprising:
  a printed wire board having circuitry thereon for operating the dynamoelectric machine, the circuitry including heat generating components;
  a heat sink in thermal contact with at least some of the heat generating components of the circuitry on the printed wire board for transferring heat from the components;
  a housing receiving and supporting the printed wire board and heat sink, the heat sink being mounted on the housing, the printed wire board being mounted on the heat sink;
  an insulator tube for each of said heat generating components in thermal contact with the heat sink, each insulator tube being made of electrically insulating and thermally conductive material and being inserted over a respective one of said heat generating components in thermal contact with the heat sink and lying between said components and the heat sink for electrically insulating said component from the heat sink while permitting thermal conduction between said component and the heat sink.

15. A drive package as set forth in claim 14 wherein the insulator tube is pinched off above said one heat generating component and folded over on itself between the clamp and said component thereby to enclose said component except at the bottom thereof.

16. A drive package as set forth in claim 15 wherein the insulator tube is made of a polyamide film.

17. A drive package as set forth in claim 14 wherein the heat sink comprises a clamp for clamping at least one of the heat generating components of the circuitry on the first printed wire board against the heat sink.

18. A drive package as set forth in claim 14 further comprising potting material located in the housing and filling the housing to at least about the level of the printed wire board, the potting material sealing the circuitry on the printed wire board from moisture, and wherein the housing has drain holes therein located closely adjacent to the potting material for draining moisture in the drive package from the housing thereby to prevent an accumulation of moisture in the housing above the potting material.

19. A drive package as set forth in claim 18 wherein the heat sink mounts the printed wire board in cantilever fashion, extending outwardly from the heat sink at a level in the housing, the potting material being in contact with the printed wire board and providing mechanical support for the printed wire board in the housing away from the heat sink.

20. A drive package as set forth in claim 19 wherein the potting material is the sole support of the printed wire board away from the heat sink.

21. A drive package as set forth in claim 20 wherein the printed wire board constitutes a first printed wire board, the drive package further comprising a second printed wire board mounted on the heat sink and extending outwardly therefrom in the housing in cantilever fashion generally above the potting material, a tie located remotely from the heat sink and attached to the first printed wire board, the tie being further attached to the second printed wire board whereby the potting material supports the second printed wire board away from the heat sink through the tie.

22. A drive package as set forth in claim 14 in combination with the dynamoelectric machine operated by the drive package.

23. A method of assembling a drive package for a dynamoelectric machine comprising the steps of:
  providing a printed wire board having circuitry thereon for operating the dynamoelectric machine, the circuitry including heat generating components, a heat sink for transferring heat from the components, and an insulator tube for each of said heat generating components, each insulator tube being made of electrically insulating and thermally conductive material;
  mounting the printed wire board on the heat sink with said heat generating components adjacent to the heat sink;

inserting one of the insulator tubes over each of said heat generating components;

clamping said heat generating components clad with the insulator tubes into engagement with the heat sink.

24. A method as set forth in claim 23 wherein the printed wire board constitutes a first printed wire board, and further comprising, prior to said clamping step, the steps of mounting a second printed wire board on the heat sink, the first and second printed wire boards extending outwardly from the heat sink in cantilever fashion, and structurally tying the second printed wire board to the first printed wire board whereby the first printed wire board supports the second printed wire board away from the heat sink.

25. A method as set forth in claim 24 further comprising the step of dropping the assembled printed wire boards and heat sink into a housing and securing the heat sink on an interior wall of the housing, the first printed wire board being disposed in the housing at a level.

26. A method as set forth in claim 27 further comprising the step of filling the housing to at least about the level of the first printed wire board with a potting material to seal the circuitry of the first printed wire board and to mechanically support the first printed wire board away from the heat sink.

27. A method as set forth in claim 26 further comprising forming the housing with holes therein closely adjacent the level of the potting material for draining moisture from the potting material.

\* \* \* \* \*